(12) United States Patent
Ron

(10) Patent No.: US 8,312,573 B2
(45) Date of Patent: Nov. 20, 2012

(54) INFLATABLE CHAMBER-POT

(75) Inventor: Izac Ron, Fredericia (DK)

(73) Assignee: GOLOO ApS, Fredericia (DK)

( * ) Notice: Subject to any disclaimer, the term of this patent is extended or adjusted under 35 U.S.C. 154(b) by 152 days.

(21) Appl. No.: 12/680,387

(22) PCT Filed: Aug. 15, 2008

(86) PCT No.: PCT/DK2008/000290
§ 371 (c)(1),
(2), (4) Date: Mar. 26, 2010

(87) PCT Pub. No.: WO2009/043349
PCT Pub. Date: Apr. 9, 2009

(65) Prior Publication Data
US 2010/0306914 A1    Dec. 9, 2010

(30) Foreign Application Priority Data
Sep. 30, 2007  (DK) .................................. 2007 01413

(51) Int. Cl.
*A47K 11/04*  (2006.01)
(52) U.S. Cl. .......................................................... 4/479
(58) Field of Classification Search ....................... 4/479
See application file for complete search history.

(56) References Cited

U.S. PATENT DOCUMENTS

| | | | | |
|---|---|---|---|---|
| 3,605,127 A | * | 9/1971 | Dailey | 4/452 |
| 5,224,223 A | * | 7/1993 | Royal | 4/451 |
| 5,394,571 A | * | 3/1995 | Vernon | 4/452 |
| 5,619,757 A | * | 4/1997 | Baratta | 4/239 |
| 6,079,058 A | * | 6/2000 | Green | 4/484 |

(Continued)

FOREIGN PATENT DOCUMENTS

CN    85 2 01 351 U    1/1986

(Continued)

OTHER PUBLICATIONS

International Search Report for International Application No. PCT/DK2008/000290 Dated Oct. 12, 2009.

*Primary Examiner* — Lori Baker
(74) *Attorney, Agent, or Firm* — Roberts Mlotkowski Safran & Cole, P.C.; David S. Safran

(57) ABSTRACT

The invention provides an inflatable receptacle which may easily be brought along, and which in the inflated state may serve as a stable seat with comfortable seat height for a person. This is achieved by an inflatable receptacle which is peculiar in that the inner membrane side and the outer membrane side are interconnected by at least one membrane joint, preferably by welding the two membrane sides at the centre part of the receptacle, where the at least one membrane joint extends partially or entirely between the lower and upper ends of the receptacle.

Great stability is achieved hereby, as optimal possibility for transferring an action of force applied to the upper end of the receptacle in parallel with the support face is created in order to absorb the action of force in a large part of the support face placed upon the base. This improved ability of transferring actions of force to the base arises because shear forces by disc action are transferred along a membrane joint according to the invention between the partial air chambers produced by establishing the membrane joint.

12 Claims, 3 Drawing Sheets

U.S. PATENT DOCUMENTS 6,449,782 B1 * 9/2002 Jones .................................. 4/451

FOREIGN PATENT DOCUMENTS

| DE | 32 16 136 A1 | 11/1983 |
| DE | 203 17 936 U1 | 3/2004 |
| DK | 92 00 162.9 U1 | 3/1992 |
| EP | 0 207 730 A1 | 1/1987 |
| FR | 1 585 769 A | 1/1970 |
| FR | 2 563 989 A1 | 11/1985 |
| GB | 686 682 | 1/1953 |
| GB | 2 220 566 A | 1/1990 |
| WO | 91/03199 A1 | 3/1991 |

* cited by examiner

INFLATABLE CHAMBER-POT

FIELD OF THE INVENTION

The present invention concerns an inflatable receptacle, preferably a chamber-pot or a toilet of the chemical closet type, wherein the receptacle in inflated condition is with at least one air chamber, preferably for atmospheric air, and where the at least one air chamber is separated from the ambient atmosphere by a flexible membrane, where the receptacle is with a support face at the lower end of the receptacle for placing the receptacle on a base, where the receptacle is with an upper end, preferably intended as a seat for a person, where the receptacle furthermore includes a centre part between the upper and lower ends, and where the air chamber consisting of a membrane surrounds the interior of the receptacle with an inner membrane side and constituting the outer side of the receptacle with an outer membrane side.

BACKGROUND OF THE INVENTION

For persons with the need of being near to a toilet, they being toddlers that are about learning to use a toilet or adults with incontinence problems, it may be a substantial restriction in their freedom of movement to be near a permanently installed water closet or alternatively to carry a chemical closet or a chamber-pot.

It is particularly troublesome to go on trips away from urban areas and into the nature where the necessary facilities are far away, and the possibility of bringing along appliances is limited to what may be carried in a small bag or a pocket.

Through the years, various solutions of inflatable receptacles have been invented which may serve as chemical closet or chamber-pot.

An example is shown in the document WO 91/03199 concerning an inflatable potty for children. In principle, this consists of two toroidal inflated superposed units, and where the outer diameter of the upper ring is less than the outer diameter of the lower ring when both rings are inflated. Even if this design is created with the intention of good stability of the chamber-pot, there is a limit to how high such a chamber-pot can be if sufficient stability is to be maintained. This entails a design where the chamber-pot is rather low, and where the lower ring will interfere with the person's foot resting on the base, making a chamber-pot of this design unsuitable for most people.

GB 2 220 566 A shows an inflatable chamber-pot designed as three torus rings of equal size. This chamber-pot will be experienced as very unstable by the user, as even small lateral movements will cause elastic deformation of the pot. In the case of an restless child pushing the upper end of the pot sideways, this lateral action of force on a chamber-pot according to this design will cause a significant deformation at one side of the support face of the chamber-pot, causing the pot to tilt and maybe overturn.

OBJECT OF THE INVENTION

The purpose of the invention is to provide an inflatable receptacle which may easily be brought along in a handbag, pocket or the like, and which in the inflated state may serve as a stable seat with comfortable seat height for a person.

DESCRIPTION OF THE INVENTION

According to the present invention, this is achieved by an apparatus of the kind mentioned in the introduction which is peculiar in that the inner membrane side and the outer membrane side are interconnected by at least one membrane joint, preferably by welding the two membrane sides at the centre part of the receptacle, where the at least one membrane joint extends partially or entirely between the lower and upper ends of the receptacle.

Great stability is achieved hereby, as optimal possibility for transferring an action of force applied to the upper end of the receptacle in parallel with the support face is created in order to absorb the action of force in a large part of the support face placed upon the base. This improved ability of transmitting actions of force to the base arises because shear forces may be transmitted by disc action along a membrane joint according to the invention between the partial air chambers produced by establishing the membrane joint. This is explained in detail by the description of FIG. 1.

The increased stability will, for example, be of great benefit in case of a restless child who pushes the upper end of the chamber-post sideways. The lateral action of force on a chamber-pot according to the prior art will cause a significant deformation at one side of the support face of the chamber-pot, causing the pot to tilt and maybe overturn.

By a chamber-pot according to the invention, tilting and overturning will be counteracted, as the partial air chambers created by the membrane joint and at each side of the latter, with regard to statics will act like the system of force termed a disc. The disc action of the partial air chambers entails that they will support each other and cause that shear forces by their appearance along the membrane joint are transferred to the support face and thereby to the base at all points where the membrane joint comes closest to the support face.

In a preferred embodiment, the at least one membrane joint is substantially perpendicular to the support face.

By such an embodiment of the invention, the strongest and most stable solution possible is achieved, as this implies the largest number of partial air chambers which can act as disc in the structure, and the shortest path for transferring the shear forces along the membrane joints in the structure. In other words, the more partial air chambers acting as disc for absorbing an action of force in parallel with the support face and the shorter path for transferring the shear forces arising thereby along the membrane joint, the better and quicker this action of force is distributed to the support face, which, all things considered, will mean less deformation of the receptacle at its support face.

In a particularly preferred embodiment, the at least one membrane joint is linear. This implies a simple membrane joint which is easily provided by the various accessible joining methods used for flexible membranes, such as plastic films.

A linear plastic film joint may e.g. be designed as a welding of outer and inner membranes and be performed by heat contact welding or high frequency electromagnetic welding.

By a linear membrane joint it is possible to make many different attractive organic and geometric patterns.

In a further preferred embodiment, the at least one air chamber of the receptacle is with at least one valve for injecting air, e.g. the exhalation air from a person.

Hereby is achieved that the receptacle can be inflated by a blow tube of a solid or flexible material. The blow tube may advantageously be pre-fitted on the receptacle and be of a flexible material. This will provide an advantageous option for the user in order to supply more air to the inflatable receptacle if during use it appears that the receptacle is to be inflated more in order to be sufficiently stable.

The valve can be made in the much used way for inflatable units where the valve is provided with a flexible flap that ensures easy inflating, but which requires a mechanical action by e.g. squeezing the valve in order that the air from the air chamber can pass out through the valve.

In a particularly preferred embodiment, the interior of the receptacle may be with an additional flexible membrane, preferably a lining bag, disposed in the interior of the receptacle and along the inner membrane side of the air chamber.

By this measure, additional certainty of the contents remaining the receptacle is achieved, as the receptacle will have a lesser tendency of leaking by a strengthening of the inner membrane of the receptacle.

The lining bag may furthermore be exchangeable, whereby there is achieved the possibility of reuse of the inflatable receptacle. Such a reusable receptacle may furthermore be without a bottom as the interior of the receptacle can be delimited downwards by means of the additional flexible membrane which may be constituted by the bottom of a lining bag.

In a further, particularly preferred embodiment, the additional flexible membrane may be connected to the inner membrane side of the at least one air chamber, preferably by a welding to the inner membrane side, at the at least one membrane joint.

Hereby is ensured that the lining bag does not fall out. At the same time, it is still possible that the bottom of the lining bag can constitute the bottom of the receptacle, making the design of the receptacle very simple.

It is furthermore to be preferred that the invention is made is a way where the additional flexible membrane in the interior of the receptacle is extended to a further position at the upper end of the receptacle and entirely or partly at the external side of the receptacle.

This embodiment provides an extra hygienic solution as the lining bag is turned down around the receptacle such that the inner side of the lining bag is facing outwards. After use, the lining bag is folded up and closed with a knot, whereby all parts of the chamber-pot that have been exposed to urine and the like during use are enclosed in the lining bag.

In a possible embodiment, the additional flexible membrane may be with a drawstring hem and a drawstring closure, preferably close the edge of the additional membrane. Hereby is achieved that the disposable chamber-pot can be closed with the string before letting out the air, whereby it is safeguarded that the contents do not come out inadvertently.

Also, it is possible to provide for a drawstring closure of the upper end of the receptacle, where this appears in a design without the additional membrane for instance. A drawstring hem with drawstring is then to be established close to the upper end of the receptacle in a way such that it is possible to close it entirely or partly while the chamber-pot is still in the inflated condition.

The drawstring and the drawstring hem can be provided by all current methods for establishing such a solution in connection with a flexible membrane.

It is furthermore an option that the interior of the receptacle can be provided with a liquid-absorbing material, preferably as an insert at the lower end of the interior of the receptacle.

By this design, a great certainty that urine and feces do not splash or lap during use, thus enhancing the comfort for the user.

It is moreover a possibility according to the invention that the inflatable receptacle is made self-inflating. This may i.e. be effected by adding a flexible cellular material inside the air chambers of the receptacle, and which may be compressed without being plastically deformed. The flexible cellular material is to be deformed elastically when subjected to pressure and in a way such that it returns to the original shape when removing the pressure.

The possibilities of establishing membrane joints as indicated by the invention and the consequent partial air chambers provide great freedom in designing the final product according to the invention. The inflatable receptacle may thus be provided with any kind of design, as viewed both in horizontal section and in vertical section. Moreover, the membrane joints may form countless number of patterns, e.g. adapted to a modern design choice for the time in question.

DESCRIPTION OF THE DRAWING

The invention will be explained below with reference to the accompanying drawing, wherein.

DETAILED DESCRIPTION OF THE INVENTION

Figure 1A:
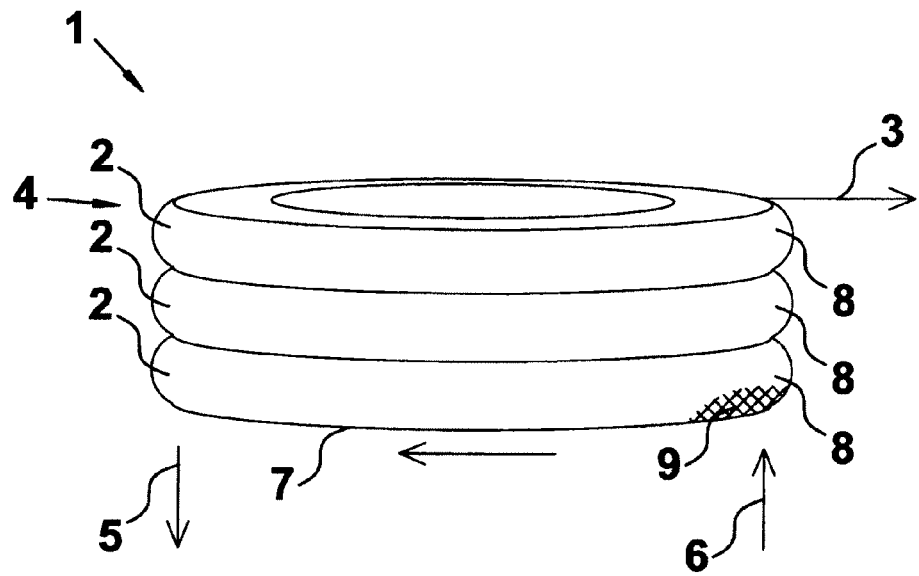
FIG. 1a shows the prior art subjected to absorbing a horizontal action of force.

On FIG. 1a appears an inflatable receptacle 1 of the prior art type. Here, three toroidal rings 2 are placed upon each other. A horizontal action of force 3 on the upper part 4 of the inflatable container 1 will entail that the receptacle 4 will try to absorb this action of force 3 by a unified disc action for the entire receptacle 4. Thereby occurs a lifting 5 and a compression 6, respectively, at the support face 7 of the receptacle. At the part of the support face 7 where the compression 6 occurs, by using a flexible membrane 8 for the formation of the toroidal rings 2 there will quickly occur an elastic deformation 9 which in the outermost consequence may cause the receptacle 4 to overturn.

Figure 1B:
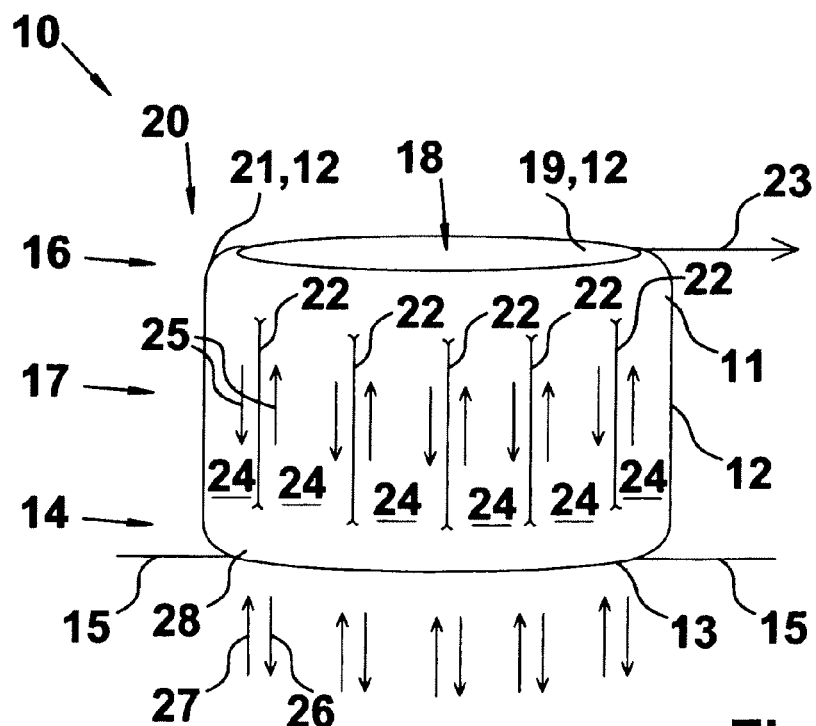
FIG. 1b shows the invention subjected to absorbing a horizontal action of force.

In FIG. 1b appears an inflatable receptacle 10 according to the invention in inflated condition. The receptacle 10 is with one air chamber 11 which is separated from the ambient atmosphere by a flexible membrane 12. The receptacle 10 is with a support face 13 at the lower end 14 of the receptacle for placing the receptacle on a base 15. The receptacle is with an upper end 16 and includes a centre part 17 between the upper end 16 and the lower end 14.

The air chamber 11 surrounds the interior 18 of the receptacle with an internal membrane side 19, and the external side 20 of the receptacle 10 is constituted by an external membrane side 21. The internal membrane side 19 and the external membrane side 21 are interconnected by a number of membrane joints 22. On FIG. 1b, five of these membrane joints 22 are visible at the centre part 17 of the receptacle.

A force 23 is applied to the upper end 16 of the receptacle 10 in parallel with the support face 15. Between the membrane joints 22 partial air chambers 24 appear, which due to the ability of the membrane joints 22 to transmit shear forces 25 will effect disc action in the absorbing of the action of force 23. The shear forces 25 are transmitted to the support face 15 and here cause lifting 25 and compression 27, respectively, at each of the areas 28 that lie immediately under a membrane joint 22. Since the action of force 23 is distributed for absorption in many sub-areas 28, by commonly occurring magnitudes of force 23 this will not cause elastic deformation of any significance at these areas.

Figure 2A:
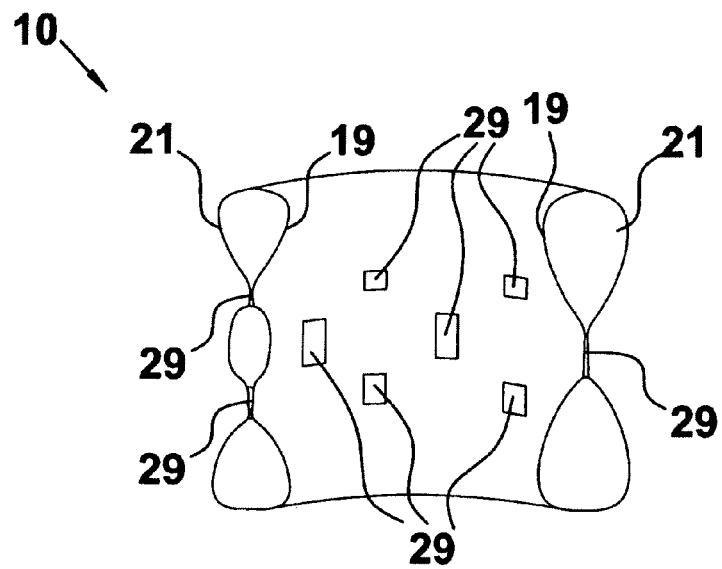
FIGS. 2a-c are different possible embodiments of a receptacle according to the invention.

FIG. 2a shows an alternative, optional design of the membrane joints 22 according to the invention. The membrane joints 22 are here in the form of a welding together of the inner membrane side 19 and the outer membrane side 21 in rectangular fields 29 arranged in a regular pattern, where two rectangular fields 29 are disposed in continuation of each other and a second rectangular field 29 is disposed offset in relation to and centrally between the two rectangular fields 29.

Figure 2B:
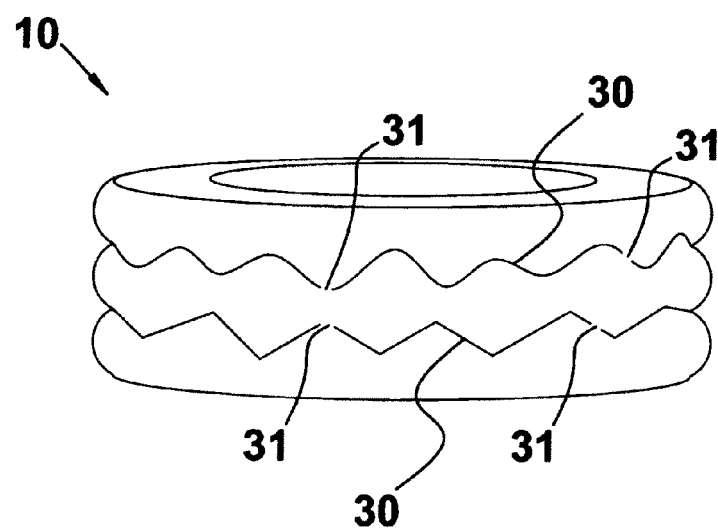

FIG. 2b shows yet an alternative optional embodiment of the membrane joints 22 where these assume a zigzag pattern in a linear course 30. There may be a pause in the linear course 30 of the membrane joints, which is shown at two points 31 on the Figure.

Figure 2C:
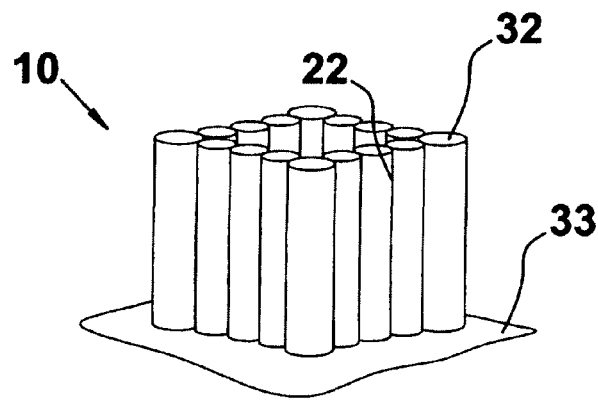

FIG. 2c indicates an alternative embodiment of the receptacle 10 where it assumes a more quadratic shape. The receptacle is with sixteen vertical partial air chambers 32 which are mutually separated by means of membrane joints 22 extending entirely between the lower end 14 and the upper end 16 of the receptacle 10. At the support face 13 of the receptacle, an underlying flexible membrane 33 is shown and which is with internal air channels (not shown) for distributing injected air to each of the vertical partial air chambers 32 via a valve in the bottom (not shown) in each of these partial air chambers 32.

Figure 3:
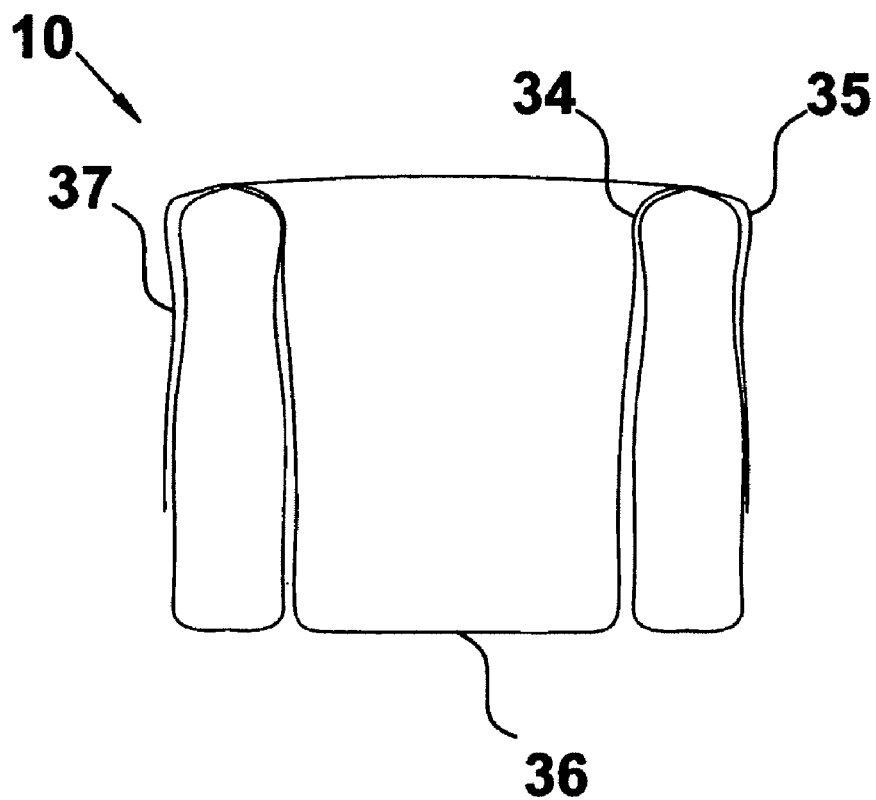
FIG. 3 shows a section in an inflatable receptacle with an additional membrane.

FIG. 3 shows a possible principle of the embodiments where a further flexible membrane 34 in the form of a lining bag 35 is disposed in the interior 18 of the receptacle and along the internal membrane side 19. The receptacle 10 is shown here without bottom as the lining bag 35 constitutes a bottom 36 for the interior 18 of the receptacle. The lining bag 35 is continued to a further position at the upper end 16 of the receptacle and at the exterior 21 of the receptacle, as the lining bag 35 is turned down around the receptacle 10 such that the inner side 37 of the lining bag 35 is facing outwards. After use, the lining bag 35 is folded up and closed with a knot or a string closure and associated drawstring hem, whereby all parts of the receptacle 10 that have been exposed to urine and the like during use become enclosed within the lining bag 35.

The invention claimed is:

1. An inflatable chamber-pot comprising an interior wherein the inflatable chamber-pot in an inflated condition comprises at least one air chamber, and where the at least one air chamber is separated from the ambient atmosphere by a flexible membrane, where the inflatable chamber-pot comprises a support face at a lower end of the inflatable chamber-pot for placing the inflatable chamber-pot on a base, where the inflatable chamber-pot comprises an upper seat end, where the inflatable chamber-pot furthermore includes a centre part between the upper seat end and the lower end, wherein said flexible membrane has an inner membrane side that surrounds the interior of the inflatable chamber-pot and an outer membrane side constitutes the outer side of the inflatable chamber-pot, wherein the inner membrane side and the outer membrane side are interconnected by at least one membrane joint, wherein the at least one membrane joint extends partially or entirely in an axial direction extending between the lower end and the upper seat ends of the inflatable chamber-pot, and wherein a lengthwise direction of the at least one membrane joint is substantially perpendicular to the support face.

2. Inflatable chamber-pot according to claim 1, wherein the at least one membrane joint is linear.

3. Inflatable chamber-pot according to claim 1, wherein the at least one air chamber comprises at least one valve for injecting air.

4. Inflatable chamber-pot according to claim 1, wherein an interior surface of the inflatable chamber-pot is formed by a lining bag, disposed in the interior of the inflatable chamber-pot and along the inner membrane side of the air chamber.

5. Inflatable chamber-pot according to claim 4, wherein the lining bag is connected to the inner membrane side of the at least one air chamber.

6. Inflatable chamber-pot according to claim 4, wherein the lining bag in the interior of the receptacle is extended to a further position over the upper end of the receptacle and at least partly onto the exterior of the receptacle.

7. Inflatable chamber-pot according to claim 1, wherein the interior of the inflatable chamber-pot is provided with a liquid-absorbing material.

8. Inflatable chamber-pot according to claim 1, wherein said at least one membrane joint interconnecting said inner membrane side and said outer membrane side are welds interconnecting the two membrane sides at a center part of the inflatable camber-pot.

9. Inflatable chamber-pot according to claim 1, wherein the at least one air chamber is filled with atmospheric air, having a connection for filling by a pump or by exhalation of air from a person.

10. Inflatable chamber-pot according to claim 4, wherein the lining bag is connected to the inner membrane side of the at least one air chamber by welding to the inner membrane side, at the at least one membrane joint.

11. Inflatable chamber-pot according to claim 6, wherein the lining bag is removable from the interior of the inflatable chamber-pot for disposal after use and for subsequent reuse of the inflatable chamber-pot with another lining bag.

12. Inflatable chamber-pot according to claim 11, wherein the at least one air chamber forms an annular bottomless body and wherein an interior bottom surface of the inflatable chamber-pot is formed by the lining bag.

* * * * *